United States Patent
Pirthauer (10) Patent No.: US 7,614,488 B2
(45) Date of Patent: Nov. 10, 2009

(54) ANTI-REACTIVE MODULAR GEAR UNIT AND LOCKING COUPLING

(75) Inventor: Helmut Pirthauer, Saal, a.d. Donau (DE)

(73) Assignee: Hans Heidolph GmbH & Co. KG, Kelheim (DE)

(*) Notice: Subject to any disclaimer, the term of this patent is extended or adjusted under 35 U.S.C. 154(b) by 438 days.

(21) Appl. No.: 11/579,150

(22) PCT Filed: Apr. 30, 2005

(86) PCT No.: PCT/EP2005/004695

§ 371 (c)(1),
(2), (4) Date: Oct. 31, 2006

(87) PCT Pub. No.: WO2005/108814

PCT Pub. Date: Nov. 17, 2005

(65) Prior Publication Data

US 2007/0199795 A1    Aug. 30, 2007

(30) Foreign Application Priority Data

May 6, 2004   (DE) ........................ 10 2004 022 368
Apr. 13, 2005 (DE) ........................ 10 2005 016 977

(51) Int. Cl.
*F16D 13/00* (2006.01)
*F16D 63/00* (2006.01)
(52) U.S. Cl. .............................. 192/113.32; 188/82.84
(58) Field of Classification Search ............. 192/223.2, 192/113.32; 188/82.84, 134
See application file for complete search history.

(56) References Cited

U.S. PATENT DOCUMENTS 3,110,381 A    11/1963   Leu et al.

(Continued)

FOREIGN PATENT DOCUMENTS

DE         435561 C    10/1926

OTHER PUBLICATIONS

Patent Abstracts of Japan, Application No. 07012785, Jan. 30, 1995, Nabco Ltd.

(Continued)

*Primary Examiner*—Dirk Wright
(74) *Attorney, Agent, or Firm*—Rothwell, Figg, Ernst & Manbeck, PC (57) ABSTRACT

The present invention relates to a retroaction-protected transmission module for a motor for driving a retroaction-endangered load, in particular of a gate, having a transmission (11) having a drive side and an output side and a blocking clutch (1) having a clutch state and a blocking state, the blocking clutch including a driveshaft (12), which has driver parts (2) on one end, between which clamping bodies (3) are movably located, which surround a head (4) of an output shaft (13), the head (4) of the output shaft (13) having coupling faces (5), which are in contact with the clamping bodies (3) in the clutch state and via which, in the clutch state, the clamping bodies (3) carried by the driver parts (2) in the event of a rotation of the driveshaft (12) transmit a torque from the driveshaft (12) to the output shaft (13), and a braking ring (6) having a clamping face (7) being located around the clamping body (3), against which the clamping bodies (3) are pressed by the coupling faces (5) in the blocking state when an external torque acts on the output shaft (12). According to the present invention, the blocking clutch (1) is located on the output side of the transmission (11) so that an external torque is absorbed by the blocking clutch (1) and the transmission (11) is thus protected from the effect of the external torque. The present invention also relates to a blocking clutch for a transmission module of this type.

16 Claims, 5 Drawing Sheets

U.S. PATENT DOCUMENTS

| | | | |
|---|---|---|---|
| 3,242,023 A | | 3/1966 | Boyden |
| 3,243,023 A | * | 3/1966 | Boyden .................... 192/223.2 |
| 4,706,791 A | * | 11/1987 | Magliano ................. 192/223.2 |
| 4,852,707 A | * | 8/1989 | Ito et al. ....................... 192/44 |
| 5,036,939 A | | 8/1991 | Johnson et al. |
| 5,896,973 A | * | 4/1999 | Hochmuth et al. ........ 192/223.2 |
| 5,899,294 A | * | 5/1999 | Shimizu et al. ............. 180/444 |
| 6,260,685 B1 | * | 7/2001 | Montanana .............. 192/223.2 |
| 6,662,921 B2 | * | 12/2003 | Yoshida et al. ................ 192/37 |
| 6,695,118 B2 | * | 2/2004 | Kurita et al. ............. 192/223.2 |
| 6,762,579 B2 | * | 7/2004 | Babcock et al. ............. 318/445 |

FOREIGN PATENT DOCUMENTS

| | | |
|---|---|---|
| DE | 508 123 | 9/1930 |
| DE | 198 09 407 A1 | 9/1998 |
| EP | 1 239 178 A2 | 3/2002 |
| EP | 1 239 178 A | 9/2002 |
| EP | 1 243 736 A1 | 9/2002 |
| GB | 2 343 923 B | 12/2000 |
| JP | 7-103260 | 9/1993 |

OTHER PUBLICATIONS

Patent Abstracts of Japan, Publication No. 2001109752 A, published Apr. 20, 2001, Toshiba Corp.

Patent Abstracts of Japan, vol. 1995, No. 7, Aug. 31, 1995 & JP 07 103260 A (Alpha Supply KK) Apr. 18, 1995.

Patent Abstracts of Japan, vol. 1996, No. 12, Dec. 26, 1996 & JP 08 200401 A (NTN Corp; NABCO LTD), Aug. 6, 1996.

* cited by examiner

ANTI-REACTIVE MODULAR GEAR UNIT AND LOCKING COUPLING

CROSS REFERENCE TO RELATED APPLICATION

This application is a 35 USC § 371 National Phase Entry Application from PCT/EP2005/004695, filed Apr. 30, 2005, and designating the United States.

The present invention relates to a retroaction-protected transmission module for a motor, suitable for driving a retroaction-endangered load. It comprises a transmission having a drive side and an output side and a blocking clutch having a clutch state and a blocking state. The clutch comprises a driveshaft, which has driver parts on one end, between which clamping bodies are movably located, the bodies surrounding a head of an output shaft, the head of the output shaft having coupling faces which are in contact with the clamping bodies in the clutch state and via which, in the clutch state, the clamping bodies, carried by the driver parts, transmit a torque from the driveshaft to the output shaft upon a rotation of the driveshaft. A braking ring has a clamping face located around the clamping bodies, against which the clamping bodies are pressed by the coupling faces in the blocking state when an external torque acts on the output shaft.

The coupling faces and the clamping bodies are in line contact, pressing against one another with differently shaped faces. Because of unavoidable microscopic irregularities and elastic or plastic deformations arising upon contact, a cylindrical roller, for example, does not contact a plane only along a geometrically exact, infinitely thin line, but rather always along a narrow strip. In this context, the term "line contact" is therefore to be understood according as a technical term, so that it is not restricted to the meaning of an ideal geometric line.

Such a blocking clutch is known from U.S. Pat. No. 4,706,791. Using blocking clutches of this type, a torque of any rotational direction may be transmitted from a driveshaft to an output shaft (clutch state), while a transmission of a torque from the output shaft to the driveshaft is suppressed (blocking state). Torque which is transmitted from the driveshaft to the output shaft is referred to here as internal torque. Torque which first engages on the output shaft, for example, torque reacting from a driven load, is referred to as external torque.

Furthermore, blocking clutches having concavely curved coupling faces are known from JP 07 103 260 A and DE 435 561 C.

A gate drive having a blocking clutch, which is used for the purpose of preventing unauthorized opening or closing of the gate, is known from EP 1 243 736 A1. In the event of unauthorized opening or closing of the gate, an external torque acts on the output shaft, which is blocked by the blocking clutch, so that the gate may not be moved. The blocking clutch used may be changed over by hand to a normal, bidirectional clutch, so that the gate may be opened by harid if necessary, for example, in the event of a power failure or a defect of the gate drive.

External torque which acts backwards via the output-shaft on a drive may be caused by impacts or also may be due to moments of inertia acting when a load is stopped. Drive units and transmission modules having a blocking clutch for counteracting against such a retroaction are referred to as retroaction-protected. Damage due to external torque, as may arise due to inertial forces or impacts, may be largely prevented by a retroaction-protected module.

Ideally, a blocking clutch is to be free of play, so that an external torque may not even cause a small movement of the driveshaft. However, blocking clutches always have more or less play. Therefore an external torque unavoidably causes a certain rotational movement of the driveshaft before it may be absorbed by the blocking clutch in the blocking state.

Furthermore, a blocking clutch must be suitable to absorb large external torque without entering irreversibly into the blocking state. If very large external torque acts on the output shaft, this may result in the clamping bodies being jammed in such a manner between the braking ring and the coupling faces may thereafter not be removed from their jammed position by a movement of the driveshaft. In such a case, the blocking clutch must be replaced or disassembled.

In blocking clutches, as are known from U.S. Pat. No. 4,706,791, for example, a reduction of the play, for example by using larger clamping bodies, results in an increase of the risk of irreversible jamming of the clamping bodies. In many applications, the risk of irreversible jamming must be as small as possible for trouble-free operation. For this reason, blocking clutches are primarily used to absorb relatively rarely occurring impacts, while external torque caused by inertia which retroact-from a driven load are absorbed by powered or magnetic brakes situated on the motor.

A blocking clutch should allow to stop a gate, which may weigh a plurality of tons, rapidly on a braking path of a few centimeters, for example to prevent pinching a person. This leads to the requirement for the least possible play of the blocking clutch without irreversible jamming of the clamping bodies. Inertial forces of the gate cause an external torque after the drive is shut down abruptly. This torque acts on the output shaft and must be absorbed to stop the gate. In such a case, one skilled in the art is therefore confronted with the problem of fulfilling two contrary requirements, namely little play and, simultaneously, minimal risk of irreversible jamming of the blocking clutch.

The object of the present invention is to show a way in which a drive, in particular a gate drive, may be better protected from external torque. In particular, it is the object of the present invention to provide a transmission module having a blocking clutch, in which irreversible jamming of the clamping bodies is largely precluded and which has reduced play.

This object is achieved by a retroaction-protected transmission module having the features specified in claim 1.

The coupling faces may be shaped convexly and may interact with clamping bodies which have concave recesses, in which the coupling faces of the head of the output shaft engage. Preferably, however, the coupling faces are shaped concavely, since concavely shaped coupling faces interact especially well with cylindrical clamping bodies, which can be produced at low cost.

If an external torque acts on the output shaft of a blocking clutch, the clamping bodies are pressed radially outward by the coupling faces on the head of the output shaft. In the preferred blocking clutch, the curved coupling faces cause the clamping bodies to be pressed radially outward under more favorable geometric conditions than with the planar coupling faces known in the prior art. For a given rotational step of the output shaft the distance is greater or the force is stronger. In this way, the clamping bodies come into contact with the clamping faces of the braking ring with a greater contact pressure upon a smaller movement of the output shaft. As a result, such a blocking clutch has reduced play and may change over more rapidly from the clutch state into the blocking state.

Because of the curved coupling faces, a blocking clutch of this type has the additional advantage that the danger of irreversible jamming of the clamping bodies between the coupling faces and the clamping face of the braking ring is substantially reduced. Even after large external torque acting on the output shaft and after a correspondingly strong contact pressure of the clamping bodies on the clamping face of the braking ring, the preferred blocking clutch may be transferred from the blocking state back into the clutch state by a reverse rotational movement of the driveshaft.

As already noted, blocking clutches are used for protecting a drive from external torque which may originate from impacts or may react from a driven load, for example. For example, if an electrical gate drive is abruptly shut down during a closing movement of a gate, for example to prevent crushing of an object or a person, an external torque is generated by inertial forces. Large garage gates may have a mass of a plurality of tons, so that correspondingly large inertial forces and therefore large external torque may arise. A blocking clutch may be used to protect an electrical gate drive from such external torque.

In the normal case, the gate drive is shut down slowly as a gate is closed, so that a differential torque is generated and the motor may absorb resulting inertial torque. In the event of emergency braking, for example to prevent crushing a person, however, large external torque must be absorbed rapidly. In order to be able to rapidly free a pinched object or a pinched person, a gate must allow reopening after emergency braking. It is clear from this example that for many applications irreversible jamming of the blocking clutch must be avoided.

In general, the danger of irreversible jamming of a blocking clutch increases with the external torque to be absorbed. In order minimize the risk of irreversible jamming blocking clutches are in the prior art primarily used for absorbing external impacts and are located, together with a brake for absorbing larger loads, between the drive motor and a downstream transmission.

In retroaction-protected modules according to the prior art, the driveshaft of the blocking clutch is coupled to the motor shaft of the drive or is even identical thereto, while the output shaft of the blocking clutch is coupled to the transmission on its input (drive) side. Such a module is known from U.S. Pat. No. 3,110,381. In such a configuration, external torque is, before it acts on the output shaft of the blocking clutch, reduced by the transmission to substantially smaller torque values. After being reduced by the transmission, the torque occurring is so small that the danger of irreversible jamming is minimized even with blocking clutches known in the prior art. This is in particular true because an electrically powered or magnetic brake is used for holding larger loads or for absorbing larger external torque caused by inertia.

A preferred blocking clutch, being suitable for absorbing large external torque without irreversibly jamming, may be located on the output side of the transmission of a gate drive and, in particular, may absorb not only external torque caused by impact, but also large external torque caused by inertia. In this way, in the event of emergency braking, for example to prevent crushing a person, the braking path of the gate, which is essentially determined by the play of the configuration, may be substantially shortened.

An important aspect of the present invention is therefore a retroaction-protected transmission module for a motor for driving a retroaction-endangered load, in particular a gate, comprising a transmission having a drive side and an output side and a blocking clutch which is located on the output side of the transmission, so that an external torque may be absorbed by the blocking clutch and the transmission is protected from the effect of the external torque.

A transmission module according to the present invention is in particular suitable for applications in which large masses must be stopped rapidly. Since the transmission is protected from external torque in a module according to the present invention, it also does not have to be designed to bear large external torque, so that a less robust and therefore more cost-effective transmission may be used for the module. In addition, an additional brake on the drive side is not required.

For applications in which during normal use an external torque acts on the output shaft of the blocking clutch, for example if a load is to be lowered, a blocking clutch is preferred which has at least one retention element which counteracts, by application of a retention force, the pressing of the clamping bodies on the braking ring.

If an external torque acts on the output shaft of a blocking clutch, the clamping bodies are pressed radially outward by the coupling faces on the head of the output shaft. While in blocking clutches according to the prior art, an arbitrarily small external torque is sufficient for this purpose, in a clutch according to the present invention, the retention force of the retention elements must first be overcome by the external torque. Only thereafter the clamping bodies are pressed with sufficient force against the braking ring to bring the blocking clutch into the blocking state. A blocking clutch according to the present invention therefore blocks only upon the action of an external torque which exceeds a predefined threshold value. The size of this threshold value may be controlled by the design of the retention elements and the retention force applied thereby.

The retention elements are preferably springs, in particular leaf spring packets, whose spring force presses the clamping bodies away from the braking ring and toward the head of the output shaft. However, it is also possible to use a single retention element, such as a ring, which is located around the head of the output shaft and the clamping bodies, so that the ring must be radially expanded by the driver parts before these may come into contact with the braking ring.

Use of springs in blocking clutches is known, in different context, namely to increase the braking action in the blocking state, for example from GB 2343923 B and U.S. Pat. No. 3,110,381. In contrast to the present invention, however, the springs are arranged in such a manner that the clamping bodies are pressed against the braking ring by the springs to increase the braking force.

Further details and advantages of the present invention are explained in greater detail hereafter on the basis of the figures. The special features illustrated and described therein may be used individually or in combination to provide preferred embodiments of the present invention. Identical and corresponding components of different exemplary embodiments are identified using the same reference numerals.

Figure 1:
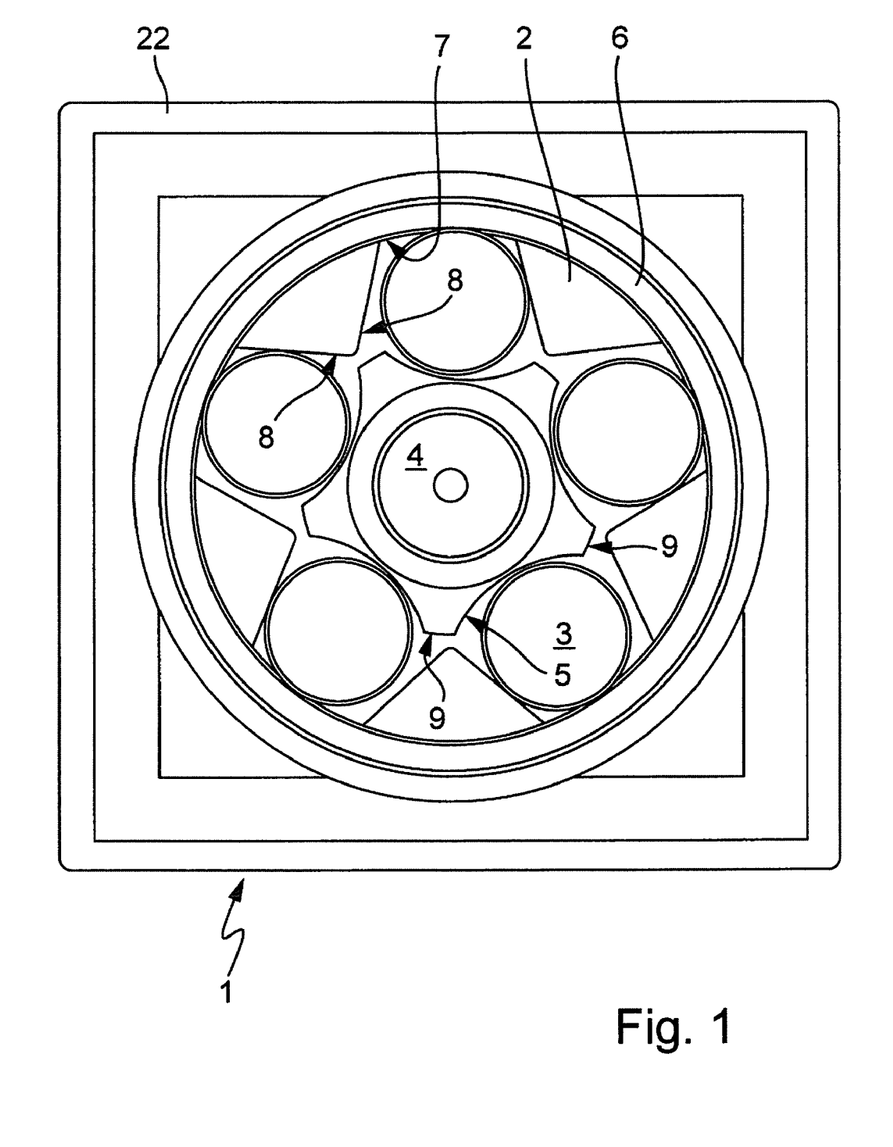
FIG. 1 shows a cross-section of a blocking clutch in the clutch state.

The blocking clutch 1 shown in FIG. 1 comprises a driveshaft, which has driver parts 2 on one end, between which clamping bodies 3 are movably located. The driver parts 2 are referred to as a whole as "crown". The clamping bodies 3 surround the head 4 of an output shaft. The head 4 of the output shaft has concavely curved coupling faces 5, with which the clamping bodies 3 are in line contact. FIG. 1 shows the blocking clutch in a cross-section running transversely to the driveshaft and the output shaft.

In the clutch state shown in FIG. 1, a torque is transmitted from the driveshaft via the driver parts 2 to the clamping bodies 3 and therefrom via the coupling faces 5 to the output shaft. The clamping bodies 3 and the coupling faces 5 are geometrically shaped in such a manner that they are each in contact only along a line. The word "line" is not to be understood here in a geometrically exact sense, since, due to elastic or plastic deformations, real bodies are always in contact along a strip of varying width. However, the clamping bodies 3 and the coupling faces are shaped so that they ideally are in contact only along a line, i.e., are in line contact, if one neglects unavoidable microscopic irregularities and deformations.

A clamping face 7 of a braking ring 6 runs around the clamping bodies 3. In the clutch state of the blocking clutch 1, the clamping bodies 3 may be at a distance to the clamping face 7 of the braking ring 6 or may press loosely against it, so that a torque may be transmitted from the driveshaft to the output shaft with minimal frictional losses. In order to reduce frictional losses, an inner chamber enclosed by the braking ring 6, in which the clamping bodies 3, the driver parts 2, and the head 4 of the output shaft are located, is filled with lubricant. The braking ring 6 is pressed into the housing 22 of the blocking clutch.

Figure 2:
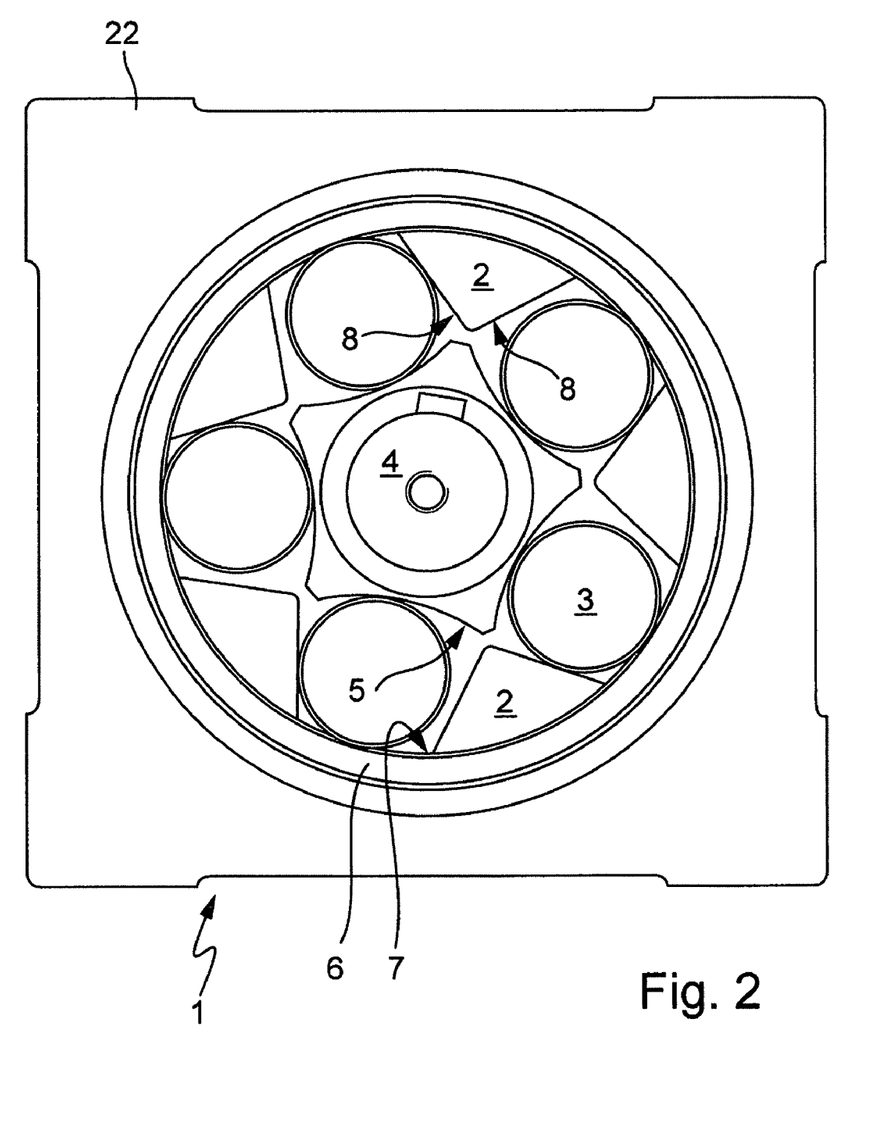
FIG. 2 shows a cross-section of a blocking clutch in the blocking state.

When an external torque acts on the output shaft, the output shaft is turned relative to the driveshaft, whereby the clamping bodies 3 move along the concavely curved coupling faces 5 and are pressed against the clamping face 7 of the braking ring 6, so that the blocking clutch 1 enters the blocking state shown in FIG. 2.

In the blocking state, all rotational movement is stopped by friction between the clamping bodies 3 and the clamping face 7 of the braking ring 6, so that no torque is transmitted from the output shaft to the driveshaft. The larger the external torque acting on the output shaft, the larger is the force with which the clamping bodies 3 are pressed by the head 4 of the output shaft against the clamping face 7 of the braking ring 6. Thus, larger external torque cause larger frictional forces, which counteract a rotational movement of the output shaft.

Due to the concave curvature of the coupling faces 5 the clamping bodies 3 are, at a given rotational state of the output shaft in relation to the driveshaft, pressed with a greater force against the clamping face 7 than with a planar coupling face. The shown blocking clutch 1 therefore has less play than comparable blocking clutches having planar coupling faces.

In the depicted exemplary embodiment, the coupling faces 5 have, in the cross-section shown, the shape of a circular arc which runs perpendicular to the output shaft. The advantages of reduced play may also be achieved by means of other concave shapes, for example, having elliptical or paraboloid curvature.

Figure 3:
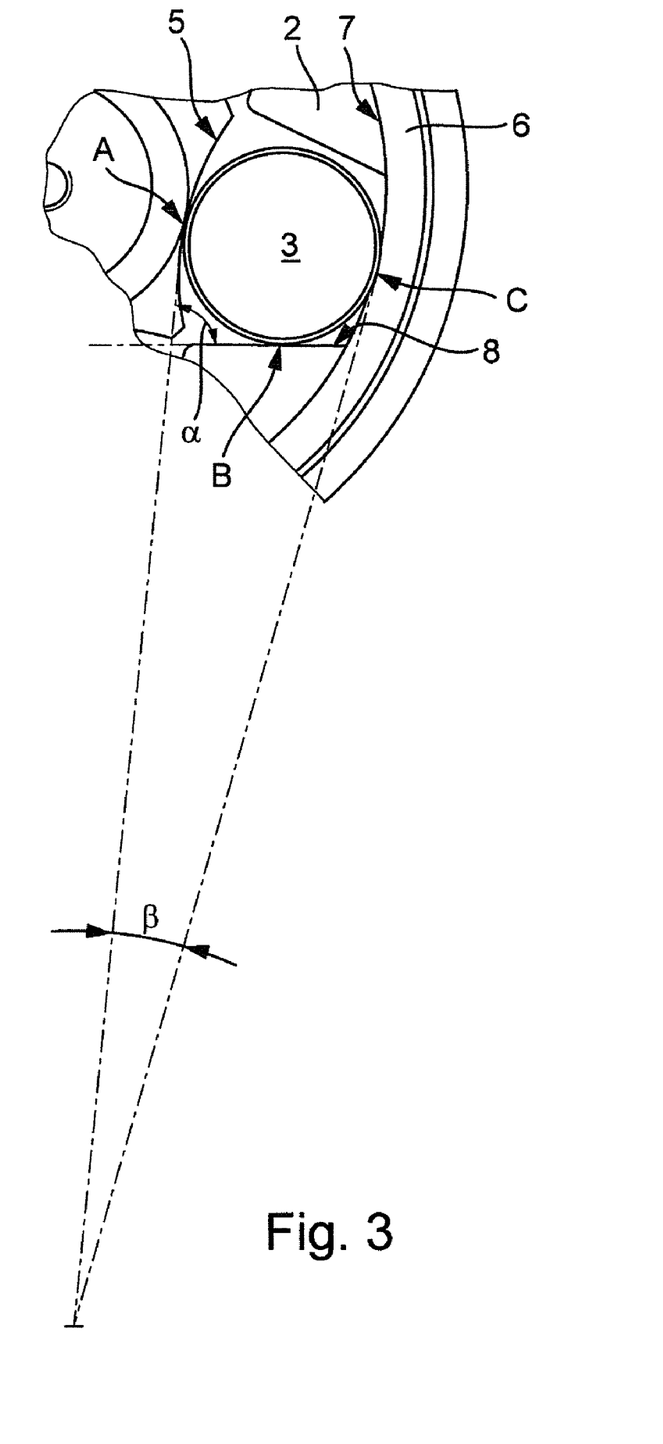
FIG. 3 shows a detail view of FIG. 2.

FIG. 3 illustrates the geometrical conditions in the blocking state on the basis of a detail view of FIG. 2.

Irreversible jamming of the clamping bodies 3 between the coupling faces 5 and the clamping face 7 of the braking ring 6, i.e., irreversible transfer of the blocking clutch into the blocking state, may be avoided most reliably by shaping the clamping bodies 3 and the coupling faces 5 in such a manner that in the blocking state, a tangent in the contact point A between each coupling face 5 and the adjoining clamping body 3 and a tangent in the contact point C between this clamping body 3 and the clamping face 7 encloses an angle β of at least 5.7°, preferably at least 7°, especially preferably at least 8°. This can be explained by the fact that these two tangents enclose a so called friction angle which for friction of steel on steel has a critical value at approximately 5.7°, at which the danger of irreversible clamping increases suddenly. The tangent in the contact point A is tangent, as shown in FIG. 3, to the coupling face 5, the tangent in the contact point C is tangent to the clamping face 7.

In order to reduce the danger of irreversible jamming of the clamping bodies even further, it is favorable if the driver parts 2, the clamping bodies 3, and the coupling faces 5 are shaped in such a manner that a tangent in the contact point A between each coupling face 5 and the adjoining clamping body 3 and a tangent in the contact point B between this clamping body 3 and a driver parts 2 encloses a preferred angle α between 60° and 85°. If the clamping body 3 is in contact with a planar driver face 8, as in the exemplary embodiment shown, the tangent in the contact point B is an extension of this driver face 8. However, it is to be noted in this context that an area contact, for example, via concavely curved driver faces 8, is also possible between the clamping body 3 and the driver face 8. Larger angles α are also possible, for example 120°, but it is to be noted that this causes a substantial increase of the friction in the clutch state between the clamping bodies 3 and the braking ring 6.

In the exemplary embodiment shown, the clamping bodies 3 are cylindrically shaped and therefore have a circular cross-section. However, the clamping bodies may also have a cross-section deviating from a circle. It is only required that the curvature of the clamping bodies 3, in the area which comes into contact with the coupling faces 5 of the head 4 of the output shaft, differs from the curvature of the coupling faces 5, so that a line contact to the coupling faces 5 results.

In the exemplary embodiment shown, precisely one clamping body 3 is assigned to each coupling face 5, i.e., precisely one clamping body 3 presses against each coupling face 5. Of course, the blocking clutch 1 shown would still function—at least to some extent—if one of the clamping bodies 3 was removed, however. The number of the coupling faces 5 and the clamping bodies 3 assigned thereto is freely selectable in broad limits, for example, between 3 and 17. An odd number of clamping bodies 3 is preferred, since then no clamping bodies 3 are exactly diametrically opposite and therefore the braking effect may be distributed more uniformly onto a plurality of clamping bodies 3.

In the exemplary embodiment shown, five driver parts 2 are located between the five clamping bodies 3. Thereby a rotational movement of the driveshaft is transmitted via the clamping bodies 3 to the output shaft. The driver parts 2 have driver faces 8 facing toward the clamping bodies 3. Faces 8 are planar in the exemplary embodiment shown, but may also be concavely curved.

The blocking clutch 1 described is in particular suitable for applications in which large masses are to be stopped suddenly or large loads must be borne without additional power expenditure. Examples are gate drives or drives of lifting platforms. External torque, as may, for example, occur upon braking of a closing movement of a gate, must be absorbed in such applications.

Figure 4:
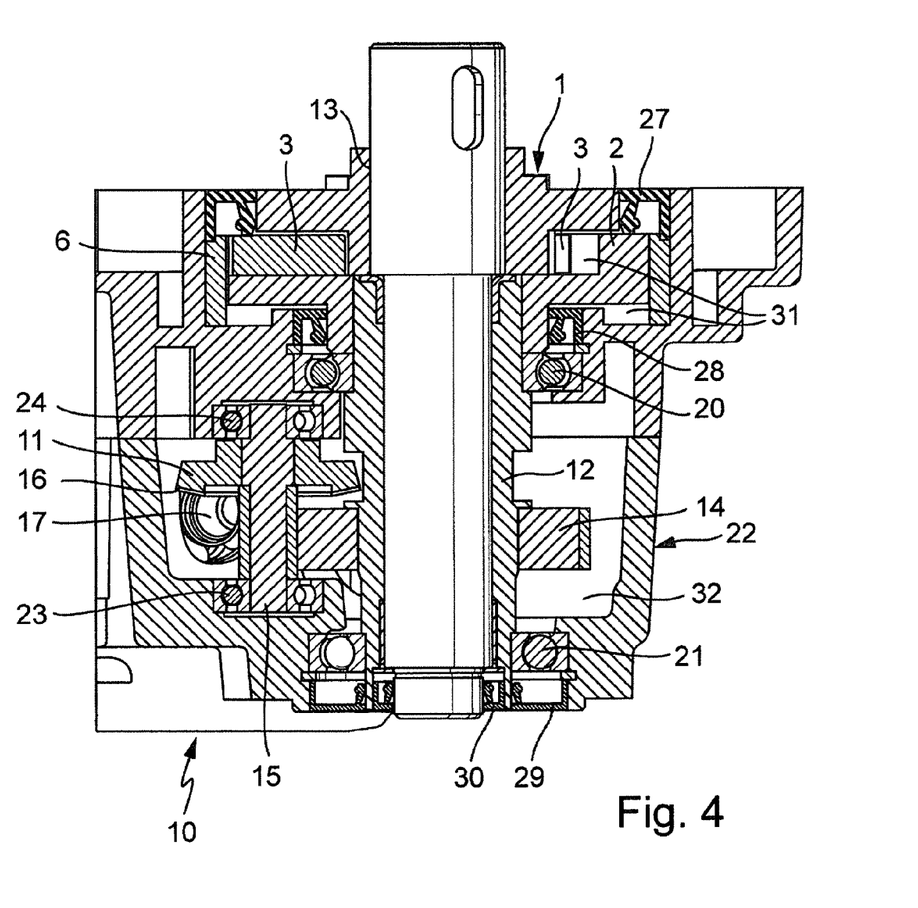
FIG. 4 shows a transmission module according to the present invention, comprising a transmission and a blocking clutch.

FIG. 4 shows a cross-section of a retroaction-protected transmission module 10 for protecting a gate drive from a retroaction caused by a load. It comprises a transmission 11 having a drive side and an output side and a blocking clutch 1 as described above, the blocking clutch being located on the output side of the transmission 11, so that an external torque is absorbed by the blocking clutch 1 and the output side of the transmission 11 is protected from the effect of the external torque.

The driveshaft 12, the output shaft 13, the braking ring 6, and two clamping bodies 3 of the blocking clutch 1 described above may be seen in the cross-sectional view of the module 10 shown in FIG. 4. A driver part 2 of the crown of the driveshaft 12 is also shown. In the exemplary embodiment shown, both the driveshaft 12 and also the output shaft 13 are hollow shafts.

The driveshaft 12 and output shaft 13 may, for example, be inserted one into the other, in order to allow a torque transmission, or may only be engaged with each other in the area of the clamping bodies 3. It is important that the driveshaft 12 and the output shaft 13 are in alignment.

The driveshaft 12 is driven by a transmission 11 which, in the exemplary embodiment shown, is an angular gear. Spur gears, worm gears, planetary gears, or combinations of such gears are, however, also possible. The transmission includes a wheel 14, which surrounds and drives the driveshaft 12, a pinion shaft 15 for driving wheel 14, a bevel gear 16 and a bevel pinion 17, by which a torque of a motor shaft (not shown) may be transmitted to the pinion shaft 15.

The driveshaft 12 is rotatably mounted in the housing 22 of the module 10 by means of two deep groove ball bearings 20, 21. The pinion shaft 15 of the transmission 11 is similarly rotatably mounted by means of deep groove ball bearings 23, 24. Other bearings of course are also possible instead of the deep groove ball bearings 20, 21, 23, 24.

The combination of a blocking clutch 1 and a transmission 11 into one module 10 has the advantage that only one single housing 22 is necessary to protect both the blocking clutch 1 and also the transmission 11 from harmful environmental influences, such as dust and moisture. Shaft gaskets 27, 28, 29, 30 are located between the output shaft 13 and the housing 22 and between the driveshaft 12 and the housing 22 so that dust and moisture may not penetrate into the interior of the housing 22.

The shaft gaskets 27 and 28 seal off an inner chamber 31, which is filled s with lubricant, in which the clamping bodies 3 are located. In the clutch state, frictional losses due to sliding of clamping bodies 3 along the braking ring 6 are reduced by the lubricant. The shaft gaskets. 20, 21 seal off a further inner chamber 32 filled with lubricant, in which the transmission 11 is located. In principle, the inner chambers 31 and 32 may be implemented as a connected, shared inner chamber of the transmission module 10. Separate inner chambers 31 and 32 may be filled with different lubricants, however, which are tailored to the different movement velocities and speeds of the transmission 11 and the blocking clutch 1. For example, the inner chamber 31 may be filled with a grease and the inner chamber 32 may be filled with an oil.

In case of emergency it must be possible to stop gates rapidly, but generally they are only moved quite slowly by the gate drive. Therefore, the output shaft 13 of the transmission module described is in operation only rotated at relatively low speeds of at most 60 rpm, so that the lubricant in the clutch state of the revolving clamping bodies 3 only causes a negligible frictional resistance. The transmission 11 of the transmission module 10 has a gear ratio of 1:50 and is designed for an electric motor having a speed of 3000 rpm. In order to adapt internal inertial torque or allow for special requirements of an application a transmission 11 having a different gear ratio or a motor having a different speed may of course also be used. In particular, a transmission module in which the output shaft 13 is in operation subjected to speeds of several thousand rpm is also possible.

Figure 5:
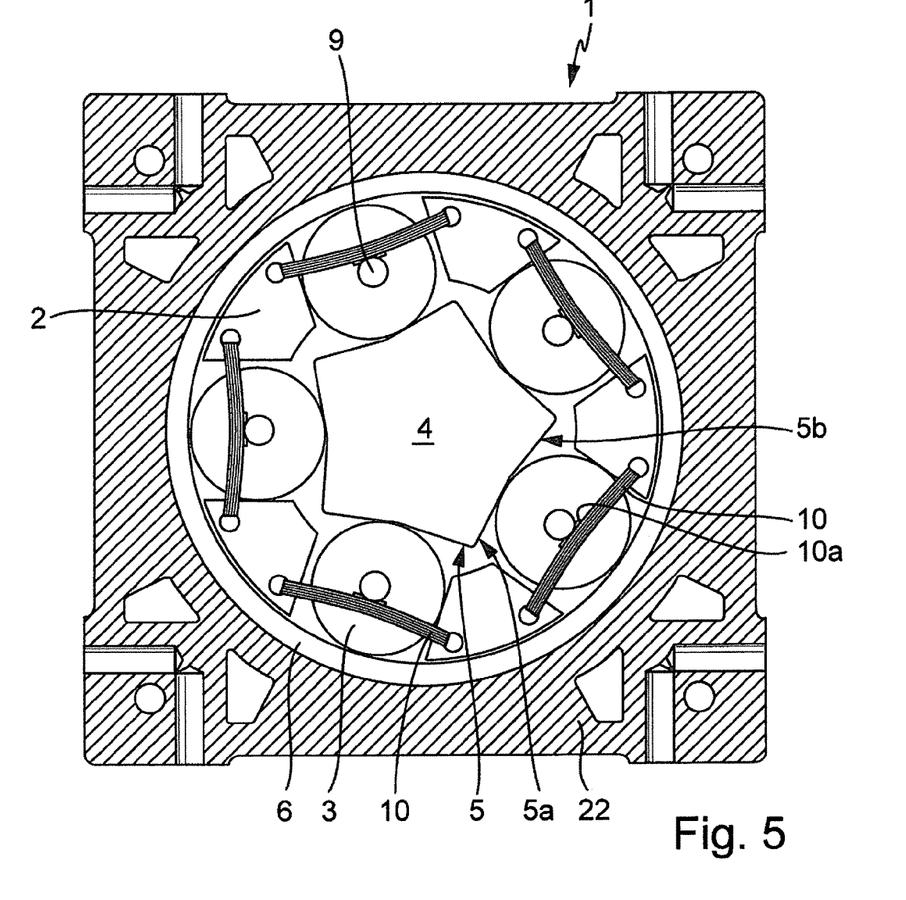
FIG. 5 shows a further exemplary embodiment of a blocking clutch.

A further exemplary embodiment of a blocking clutch is shown in FIG. 5. The blocking clutch 1 has retention elements 10, which apply a retention force on the clamping bodies 3 which acts contrary to the contact pressure by which the clamping bodies are pressed onto the braking ring 6. In the exemplary embodiment shown, the retention elements 10 are implemented as leaf spring packets, which are attached to the driver parts 2. The clamping bodies 3 have a support 9 in the form of a pin located centrally on their front faces. The retention elements 10 press against this support. In this way, a retention force, which is directed radially inward, i.e., toward the head 4 of the output shaft, is exerted on the clamping bodies 3 by the retention elements 10.

If an external torque acts on the output shaft, a force is generated which presses the clamping bodies 3 radially outward and acts to turn the output shaft in relation to the driveshaft, i.e., the head 4 in relation to the driver parts 2. Thus an external torque causes a load acting on the retention elements 10 and a force which counteracts the retention force of the retention elements 10.

In the blocking clutch 1 shown, the retention force of the retention elements 10 predefines a threshold value for the external torque, preferably of at least 10 Nm, especially preferably at least 25 Nm at a rated torque of the transmission 11 of 40 Nm. If an external torque which is less than this threshold value acts on the output shaft, the clamping bodies 3 are pressed by the retention force of the retention elements 10 against the head 4 of the output shaft. In the event of external torque which exceed the predefined threshold value, the retention force of the retention elements 10 is overcome, so that the clamping bodies 3 are pressed against the clamping face 7 of the braking ring. The clamping bodies 3 move a short distance along the concavely curved coupling faces 5 until a further movement of the head 4 of the output shaft in relation to the drivers 2 of the driveshaft is prevented by the contact pressure of the clamping bodies 3 on the clamping face 7 of the braking ring 6. Thus the blocking clutch 1 enters the blocking state in this way.

In the blocking state, every rotational movement is stopped by friction between the clamping bodies 3 and the clamping face 7 of the braking ring 6, so that a torque may not be transmitted from the output shaft to the driveshaft. The more the external torque acting on the output shaft exceeds a threshold value predefined by the retention force of the retention elements 10, the greater is the force with which the clamping bodies 3 are pressed by the head 4 of the output shaft against the clamping face 7 of the braking ring 6. In this way, larger contact pressures and therefore larger clamping forces, which counteract a rotational movement of the output shaft, is generated by larger external torque.

Especially large retention forces and therefore higher threshold values for the external torque may be achieved by arranging the retention elements 10 so that they are stressed by compression in the blocking state. This may be achieved by a design in which are curved arch of the retention elements 10 faces toward the head 4 and by a suitable connection to the driver parts 3.

The retention elements 10 each have a guide 10a for positioning the support 9. A spring of the leaf spring packets forming the retention elements 10 is illustrated together with a guide 10a in the detail view shown in FIG. 6. In the exemplary embodiment shown, the guides 10a are implemented as protrusions on the retention elements 10, between which the support 9 of the clamping body 3 is located. The object of the guide 10a is to ensure that the clamping bodies 3 are positioned correctly between the driver parts 2 and, as a result, an optimum force action of the spring forces of the retention elements 10 results.

Figure 6:
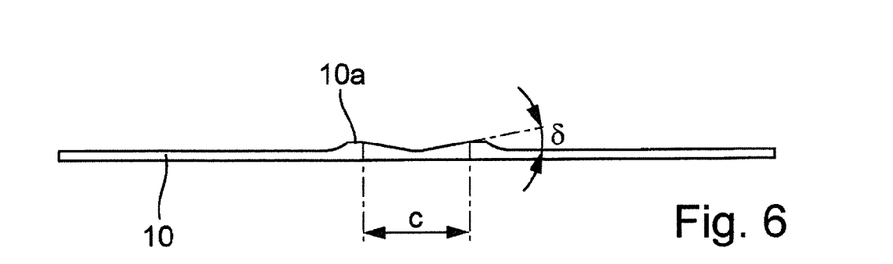
FIG. 6 shows a detail view of FIG. 5.

The guide 10a is preferably implemented so that the support 9 may move laterally from a central equilibrium position, but such a movement generates return forces. In the exemplary embodiment shown, the guides 10a are therefore implemented as protrusions which permit a lateral movement to a small degree. The further the support 9 moves to the side, the higher the support 9 lies on the guide 10a, so that the corresponding retention element 10 is tensioned and its spring forces generate a return force into the equilibrium position. It is especially favorable if the guide 10a comprises two partial faces which enclose an angle δ between 5° and 25°, preferably between 8° and 15°, with the retention element 10.

A further difference between the blocking clutches shown in FIGS. 1 and 5 is the shape of the coupling faces 5. While the coupling faces 5 of the blocking clutch shown in FIG. 1 have the shape of a circular arc over their entire length, the coupling faces 5 of the blocking clutch shown in FIG. 5 have the shape of a circular arc in a middle section while planar sections of the coupling faces 5 adjoin tangentially. The circularly shaped section of the coupling faces 5 may be very small, so that the mechanical properties of the coupling faces 5 are essentially determined by the two planar sections of the coupling faces 5. An overall convex shape of the coupling faces 5 having the advantages described above may also be achieved by coupling faces 5 with planar partial sections 5a and 5b. Planar partial faces 5a, 5b of the coupling faces 5 may be manufactured more easily than sections in the shape of a circular arc. 15 The partial faces 5a, 5b of a coupling face 5 are preferably located at an angle of 160° to 175°, in particular preferably 165° to 170°, to one another.

In coupling faces 5 which have planar partial faces 5a, 5b, it is possible that the clamping bodies 3 are in linear contact with both planar partial faces 5a, 5b in the clutch state. Upon entry into the blocking state or also in the event of somewhat higher load in the clutch state, the clamping body 3 moves on the coupling face 5, so that it is only in linear contact with one of the two partial faces 5a, 5b.

The blocking clutch 1 shown in FIG. 5 is in particular suitable for applications in which loads must be lowered, as is the case in lifting platforms, for example. In applications of this type, only extreme torque exceeding a critical threshold value must be absorbed by the blocking clutch.

The blocking clutch 1 shown in FIG. 5 is preferably used in combination with a brake located on the motor side of the transmission. In a module shown in FIG. 4, the transmission is protected from impacts by the blocking clutch, so that it is not subjected to any external torque above a threshold value predefined by the retention elements 10. The brake located on the motor side (not shown) prevents that, for example, external torque caused by gravity in lifting platforms or tilting gates, which is less than this threshold value, cause slow sinking of the lifting platform or closing of the tilting gate when the motor is turned off.

The invention claimed is:

1. A retroaction-protected transmission module for a motor for driving of a retroaction-endangered load, wherein during an emergency stop of the load, a large external torque is generated by inertial force and must be absorbed rapidly, the module comprising a transmission having a drive side and an output side and a blocking clutch having a clutch state and a blocking state, wherein the blocking clutch includes a driveshaft, having at one end thereof driver parts, between which clamping bodies are movably located, the clamping bodies surrounding a head of an output shaft, the head of the output shaft has coupling faces, wherein, in the clutch state, the clamping bodies are in contact with the driver parts and with the coupling faces of the output shaft, whereby, in the clutch state, the clamping bodies carried by the driver parts are configured to transmit a torque from the driveshaft to the output shaft-during rotation of the driveshaft, a braking ring having a clamping face is arranged around the clamping bodies, the clamping bodies being pressed by the coupling faces in the blocking state against the clamping face when an external torque acts on the output shaft, the blocking clutch is arranged on the output side of the transmission so that an external torque is absorbed by the blocking clutch whereby the transmission is protected from the effect of the external torque, and the clamping bodies and the coupling faces are shaped so that, in the blocking state, a tangent in a contact point A between one of the coupling faces and the adjoining clamping body and a tangent in a contact point C between this clamping body and the clamping face enclose an angle β of at least 5.7°.

2. The transmission module according to claim 1, wherein the transmission and the blocking clutch are located in a single housing.

3. The transmission module according to claim 1, wherein the coupling faces are shaped concavely.

4. The transmission module according to claim 1, wherein the clamping bodies and the coupling faces are shaped so that, in the blocking state, a tangent in the contact point A between one of the coupling faces and the adjoining clamping body and a tangent in the contact point C between this clamping body and the clamping face enclose an angle β at least 7°.

5. The transmission module according to claim 1, wherein the driver parts, the clamping bodies, and the coupling faces are shaped so that a tangent in the contact point A between one of the coupling faces and the adjoining clamping body and a tangent in the contact point B between this clamping body and a driver part enclose an angle α between 60° and 85°.

6. The transmission module according to claim 1, wherein the braking ring encloses an inner chamber filled with lubricant, in which the clamping bodies, the driver parts, and the head of the output shaft are located.

7. The transmission module of claim 1, wherein the module is configured for moving a gate.

8. A blocking clutch having a clutch state and a blocking state, comprising a driveshaft having at one end thereof driver parts between which clamping bodies are movably located, the clamping bodies surrounding a head of an output shaft, the head of the output shaft having coupling faces which, in the clutch state, are in contact with the clamping bodies and via which, in the clutch state, the clamping bodies carried by the driver parts transmit during rotation of the driveshaft a torque from the driveshaft to the output shaft, a braking ring having a clamping face being arranged around the clamping bodies, the clamping bodies being, in the blocking state, pressed by the coupling faces against the clamping face characterized in that the blocking clutch has at least one retention element, which acts with a retention force against the contact pressure of the clamping bodies on the braking ring.

9. The blocking clutch according to claim 8, characterized in that the retention elements are each attached to neighboring driver parts.

10. The blocking clutch according to claim 8, characterized in that the retention elements are springs.

11. The blocking clutch according to claim 10, characterized in that the springs are leaf springs.

12. The blocking clutch according to claim 11, characterized in that a leaf spring packet acts on every clamping body.

13. The blocking clutch according to claim 8 characterized in that the retention elements are arranged in such a manner that they are, in the blocking state, stressed by compression.

14. The blocking clutch according to claim 8, characterized in that the clamping bodies have a support on at least one front face, preferably on both front faces, via which the retention elements exert the retention force on the clamping bodies.

15. The blocking clutch according to claim 14, characterized in that the retention elements have a guide for positioning the support.

16. A use of a blocking clutch according to claim 8 for a drive for raising and lowering a load.

\* \* \* \* \*